(12) United States Patent
Lee et al.

(10) Patent No.: US 10,803,448 B2
(45) Date of Patent: Oct. 13, 2020

(54) MULTI CARD GENERATION METHOD, MULTI CARD USE METHOD AND MULTI CARD SYSTEM

(71) Applicant: KONA I CO., LTD, Seoul (KR)

(72) Inventors: Sang Jae Lee, Seoul (KR); Wan Jae Lee, Seoul (KR); Sung Uh Park, Seoul (KR)

(73) Assignee: KONA I CO., LTD., Seoul (KR)

( * ) Notice: Subject to any disclaimer, the term of this patent is extended or adjusted under 35 U.S.C. 154(b) by 0 days.

(21) Appl. No.: 15/519,774

(22) PCT Filed: Apr. 3, 2015

(86) PCT No.: PCT/KR2015/003350
§ 371 (c)(1),
(2) Date: Apr. 17, 2017

(87) PCT Pub. No.: WO2016/060345
PCT Pub. Date: Apr. 21, 2016

(65) Prior Publication Data
US 2017/0243198 A1    Aug. 24, 2017

(30) Foreign Application Priority Data

Oct. 17, 2014 (KR) ........................ 10-2014-0140850

(51) Int. Cl.
*G06K 19/07* (2006.01)
*G06Q 20/34* (2012.01)
(Continued)

(52) U.S. Cl.
CPC ....... *G06Q 20/3572* (2013.01); *G06K 19/044* (2013.01); *G06K 19/06187* (2013.01);
(Continued)

(58) Field of Classification Search
CPC .................................................. G06Q 20/3572
(Continued)

(56) References Cited

U.S. PATENT DOCUMENTS 6,005,942 A     12/1999 Chan et al.
2002/0175207 A1  11/2002 Kashef et al.
(Continued)

FOREIGN PATENT DOCUMENTS

CN    103164813 A    6/2013
CN    103797500 A    5/2014
(Continued)

OTHER PUBLICATIONS

A Ubiquitous NFC Solution for the Development of Tailored Marketing Strategies Pubmed Central ID: 3690058 Digital Object Identifier: 10.3390/s130506334 ISSN: 1424-8220 (Year: 2013).*
(Continued)

*Primary Examiner* — Bruce I Ebersman
*Assistant Examiner* — John A Anderson
(74) *Attorney, Agent, or Firm* — Novick, Kim & Lee, PLLC; Sang Ho Lee

(57) ABSTRACT

The present invention relates to a multi card generation method, a multi card use method and a multi card system. The present invention relates to a multi card in which at least one piece of card information is issued in one multi card having an IC chip, and one of such a plurality of cards is selected and used as a main card.

8 Claims, 12 Drawing Sheets

(51) Int. Cl.
    *G06K 19/06*     (2006.01)
    *G06K 19/04*     (2006.01)
    *G06K 19/077*     (2006.01)

(52) U.S. Cl.
    CPC ......... *G06K 19/07* (2013.01); *G06K 19/0723* (2013.01); *G06K 19/07707* (2013.01); *G06Q 20/34* (2013.01); *G06Q 20/355* (2013.01)

(58) Field of Classification Search
    USPC ...................................................... 705/35–41
    See application file for complete search history.

(56) References Cited

U.S. PATENT DOCUMENTS

| | | | | |
|---|---|---|---|---|
| 2005/0196021 | A1* | 9/2005 | Seto | G06K 9/00221 |
| | | | | 382/118 |
| 2012/0078783 | A1* | 3/2012 | Park | G06Q 20/105 |
| | | | | 705/41 |
| 2014/0046784 | A1* | 2/2014 | Prakash | G06K 19/07 |
| | | | | 705/17 |
| 2015/0278801 | A1* | 10/2015 | Friedlander | G06Q 30/0207 |
| | | | | 705/41 |
| 2017/0024735 | A1* | 1/2017 | Kawauchi | G06Q 20/403 |

FOREIGN PATENT DOCUMENTS

| | | |
|---|---|---|
| KR | 1020030083999 A | 11/2003 |
| KR | 100426687 B1 | 4/2004 |
| KR | 1020090023433 A | 3/2009 |
| KR | 1020100055130 A | 5/2010 |
| WO | 2012/167202 A2 | 12/2012 |

OTHER PUBLICATIONS

International Search Report in International Application No. PCT/KR2015/003350 filed Apr. 3, 2015.

* cited by examiner

US 10,803,448 B2

MULTI CARD GENERATION METHOD, MULTI CARD USE METHOD AND MULTI CARD SYSTEM

CROSS-REFERENCE TO RELATED APPLICATIONS

This application is the U.S. national stage application of International Patent Application No. PCT/KR2015/003350, filed Apr. 3, 2015, which claims priority to Korean Application No. 10-2014-0140850, filed Oct. 17, 2014, the disclosures of each of which are incorporated herein by reference in their entirety.

TECHNICAL FIELD

Embodiments of the inventive concepts described herein relate to a multi-card generation method, a multi-card use method, and a multi-card system, and more particularly, relate to a multi-card for storing information regarding a plurality of cards in the card having an integrated circuit (IC) chip and allowing a user to select any one of the plurality of cards and use the selected card.

BACKGROUND ART

A card, typically, a credit card refers to a plastic piece for checking identity and an account of a customer in credit transaction where he or she first receive a product or service and automatically repay the price for the product or service later from his or her bank account.

FIG. 1 illustrates the appearance of a conventional card.

An integrated circuit (IC) chip 11 may be mounted on a conventional card 10 made of plastic materials. A card number 12, an expiration date 13, and a card user's name 14 for identifying the card 10 may be carved on a surface of this card 10. Although not illustrated in FIG. 1, a signature block for a name, a card validation code (CVC) number necessary for payment, and the like may be written on the back of this card 10. As such, personal information or information associated with payment may be exposed on the surface of the conventional card 10 as it is.

Thus, personal information may be exposed and misused upon loss of the conventional card 10.

Also, since a separate plastic card is issued for each type of an issued card, there is inconvenience in which a user simultaneously carries a plurality of cards in his or her wallet. For example, there is inconvenience in which the user carries a plurality of cards, such as membership cards, prepaid cards, check cards, and coupon cards, for receiving other services other than a credit card in his or her wallet.

In such a conventional card system which provides a separate plastic card for each service, there are a plurality of cards the user should have and a card company which issues cards should consume considerable expenses or costs due to issuance and delivery of plastic cards.

FIG. 2 is a drawing illustrating the appearance of a conventional multi-card developed to solve such a problem.

A conventional multi-card 20 of FIG. 2 may have a separate power unit therein and may have a separate display unit 21 for selecting any one of cards stored therein. Also, the conventional multi-card 20 may have a separate switch 22 for selecting cards.

In other words, the conventional multi-card 20 can be operated only when the power unit is equipped therein.

When the power unit is not equipped, it is impossible to select one of a plurality of cards and use the conventional multi-card 20.

FIG. 3 is a drawing illustrating a method for storing card information in such a conventional multi-card.

To store card information in the conventional multi-card, magnetic information of a conventional plastic card 10 should be read using separate magnetic reader equipment 30. The information read by the magnetic read equipment 30 should be stored in the conventional multi-card.

Thus, this conventional multi-card 20 proposes only a solution to inconvenience in which a user should carry a plurality number of plastic cards. However, the conventional multi-card cannot solve a problem in which the user should issue the conventional plastic card 10. Also, since a card company should continuously issue the conventional plastic card 10, cost burden occurred by issuing the conventional plastic card 10 may not be solved.

Above all, Copying magnetic information read from the conventional plastic card 10 may be illegal. Thus, copying magnetic information from the conventional plastic card 10 may be aid and abet stolen of the cards.

Therefore, there is a novel multi-card model for solving all the problem of the conventional plastic card 10 and the problem of the conventional multi-card.

DISCLOSURE

Technical Problem

Embodiments of the inventive concepts provide a multi-card generation method, a multi-card use method, and a multi-card system for storing a plurality of card information in an IC card.

Embodiments of the inventive concepts provide a multi-card generation method, a multi-card use method, and a multi-card system for selecting and using one of a plurality of cards stored in an IC card.

Embodiments of the inventive concepts provide a multi-card generation method, a multi-card use method, and a multi-card system for solving a security problem and an issuance problem of a conventional multi-card.

Technical Solution

According to an aspect of an embodiment, a multi-card generation method may include transmitting, by a terminal device, a card issuance application to a card issuer server, receiving, by the terminal device, a card authentication request or a tagging request of an integrated circuit (IC) card from the card issuer server, transmitting, by the terminal device, an authentication information received from the IC card to the card issuer server, receiving, by the terminal device, a card issuance information corresponding to the authentication information verified by the card issuer server, and transmitting, by the terminal device, the card issuance information corresponding to the authentication information to the IC card.

The method may further include, after transmitting, by the terminal device, the card issuance information corresponding to the authentication information to the IC card, receiving, by the terminal device, a card issuance completion information from the IC card and transmitting, by the terminal device, the card issuance completion information to the card issuer server.

The method may further include, after transmitting, by the terminal device, the card issuance application to the card issuer server, receiving, by the terminal device, a card issuance preparation completion information from the card issuer server and transmitting, by the terminal device, a card issuance request to the card issuer server.

The reception of the card issuance information corresponding to the authentication information from the card issuer server at the terminal device may be performed by establishing, by the card issuer server, a session (security area) with the terminal device and transmitting, by the card issuer server, the card issuance information corresponding to the authentication information to the terminal device.

According to another aspect of an embodiment, a multi-card generation method may include being, by an IC card, tagged to a terminal device, transmitting, by the IC card, an authentication information to the terminal device, receiving, by the IC card, a card issuance information corresponding to the authentication information from the terminal device, and storing, by the IC card, the card issuance information corresponding to the authentication information in an IC chip of the IC card.

The method may further include, after storing, by the IC card, the card issuance information in the IC chip of the IC card, transmitting, by the IC card, a card issuance completion information to the terminal device. The reception of the card issuance information corresponding to the authentication information from the terminal device at the IC card may be performed by establishing, by the terminal device, a session (security area) with the IC card and transmitting, by the terminal device, the card issuance information to the IC card.

According to another aspect of an embodiment, a multi-card generation method may include receiving, by a card issuer server, a card issuance application from a terminal device, generating, by the card issuer server, a card issuance data and transmitting a card issuance preparation completion information to the terminal device, receiving, by the card issuer server, a card issuance request from the terminal device, transmitting, by the card issuer server, a card tagging request or a card authentication request to the terminal device, receiving, by the card issuer server, an authentication information of an IC card from the terminal device, verifying, by the card issuer server, the authentication information of the IC card, and transmitting, by the card issuer server, card issuance information corresponding to the authentication information to the terminal device.

The method may further include, after transmitting, by the card issuer server, the card issuance information corresponding to the authentication information to the terminal device, receiving, by the card issuer server, a card issuance completion information from the terminal device and performing, by the card issuer server, a card issuance completion processing. The transmitting of the card issuance information corresponding to the authentication information to the terminal device at the card issuer server may be performed by establishing, by the card issuer server, a session (security area) with the terminal device and transmitting, by the card issuer server, the card issuance information to the terminal device.

According to another aspect of an embodiment, a multi-card use method may include being, by an IC card, tagged to a terminal device, transmitting, by the IC card, information of cards stored in the IC card to the terminal device, receiving, by the IC card, information of a card selected as a payment card from the terminal device, and storing, by the IC card, the information of the card selected as the payment card in the IC card.

According to another aspect of an embodiment, a multi-card use method may include being, by a terminal device, tagged to an IC card, receiving, by the terminal device, an information of cards stored in the IC card from the IC card, generating, by the terminal device, information of a card selected as a payment card when at least one of the cards stored in the IC card is selected, and transmitting, by the terminal device, the information of the card selected as the payment card to the IC card.

The information of the card selected as the payment card may include information of a card to be used as a main payment card and information of a card to be used as a sub-payment card. The sub-payment card may be paid when the main payment card is not approved to perform payment.

Advantageous Effects

According to an exemplary embodiment of the inventive concept, a multi-card generation method, a multi-card use method, and a multi-card system may have the following effects.

First, a user may receive benefits of various cards by using one card. Thus, inconvenience in which the user carries a plurality of cards may be reduced.

Second, a consumer may not need to change his or her conventional consumption pattern. Thus, the consumer may use a contact card, a contactless card, a combination (combi) card, or a hybrid card without change in such a manner as to use the contact card, the contactless card, the combi card, or the hybrid card.

Third, since information exposed from the surface of a card is minimized, personal information may be prevented from being exposed upon the loss of the card.

Fourth, stable security may be achieved by storing information regarding a plurality of cards in a card where an IC chip is embedded, rather than a magnetic stripe (MS) card.

Fifth, time and costs consumed when a card company delivers a plastic card may be saved. About a week may be consumed to deliver a plastic card in a conventional card application system. According to the multi-card generation method, the multi-card use method, and the multi-card system according to an exemplary embodiment of the inventive concept, a card may be issued in real time only if it is possible to issue it through a card company. Also, problems of losing a plastic card and delivering the plastic card to others, which may occur due to the delivery of the plastic card, may be originally prevented.

Sixth, a conventional multi-card may aid and abet a security problem and unlawfulness in that card information is stored in the multi-card in such a manner as to copy information in magnetic stripes. According to a multi-card according to an exemplary embodiment of the inventive concept, an authorized card issuance institution may directly issue a card to an IC card via a terminal device, thus increasing security.

Lastly, one of cards stored in an IC card may be selected as a main payment card, and the other of the cards may be selected as a sub-payment card. Thus, although the main payment card is not approved to perform payment, it is possible to perform the payment using the sub-payment card. Thus, in a case where the main payment card is not approved to perform payment, for example, when a balance is insufficient in a state where a check card is selected as the main payment card, the sub-payment card proceeds with payment.

BEST MODE

Hereinafter, a description will be given in detail of embodiments according to the inventive concept with reference to the accompanying drawings. Various modifications are possible in embodiments of the inventive concept, and the inventive concept may have various faints. The specific embodiments are exemplified in the accompanying drawings and are described in detail in the specification. However, the inventive concept is not intended to be limited to the specific embodiments, and it is understood that it should include all modifications, equivalents, and substitutes within the scope and technical range of the inventive concept.

Figure 4:
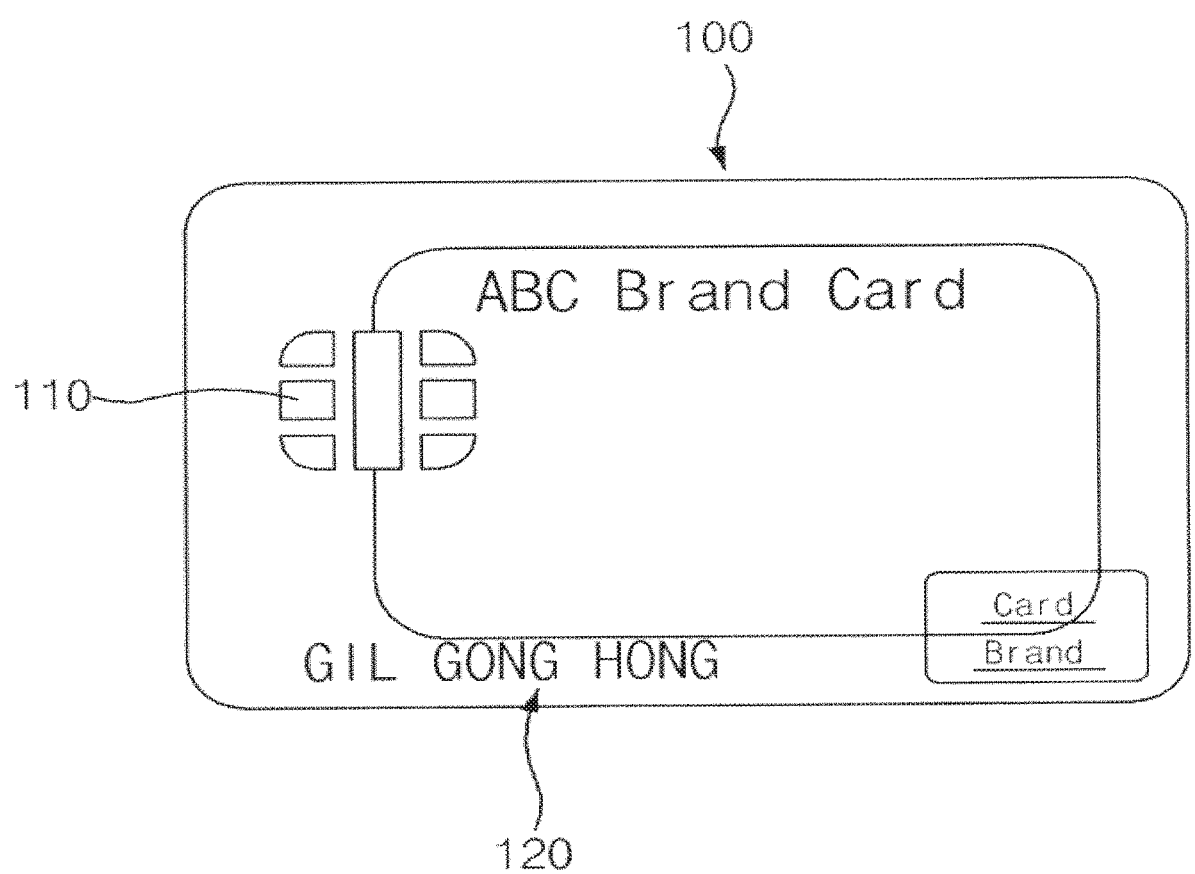
FIG. 4 is a drawing illustrating the appearance of an IC card used in a multi-card generation or use method according an exemplary embodiment of the inventive concept.

FIG. 4 is a drawing illustrating the appearance of an IC card used in a multi-card generation or use method according an embodiment of the inventive concept.

In the card used in the multi-card generation or use method according an embodiment of the inventive concept, information such as a card number, an expiration date, a card validation code (CVC) number, and the like may be omitted from appearance. Only an IC chip 110 and a name 120 may be simply written on the card.

Thus, an IC card used in a multi-card generation method, a multi-card use method, and a multi-card system according an embodiment of the inventive concept may prevent personal information or information necessary for payment from being exposed or misused upon loss of the IC card.

Such an IC card may be a card which has only an IC chip without including a component which may supply power of a battery to the inside of the IC card and may be the same card as a generally used card. Therefore, the IC card used in the multi-card generation or use method according an exemplary embodiment of the inventive concept may include only a passive IC chip which does not need a separate power supply therein and may solve a problem of a conventional multi-card described with reference to FIGS. 2 and 3, that is, a problem in which a card may be issued or used only when the power is supplied to the card.

Figure 5:
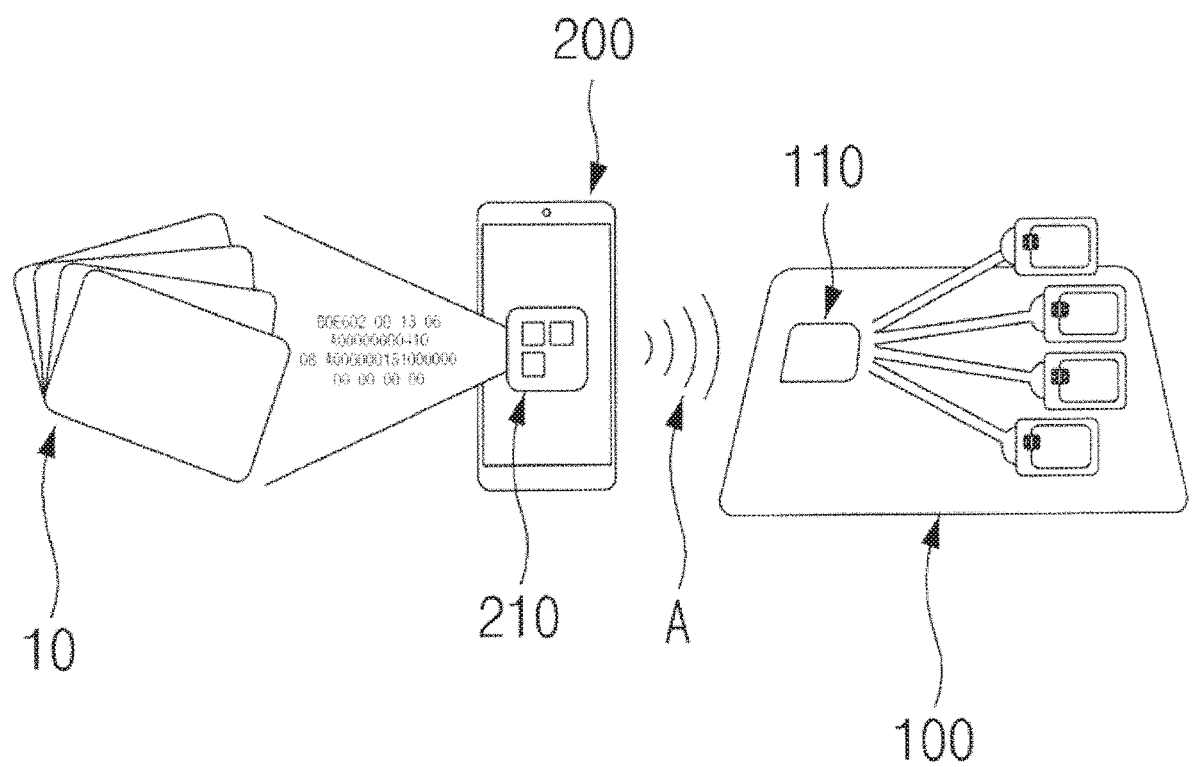
FIG. 5 is a drawing conceptually and schematically illustrating a multi-card generation method, a multi-card use method, and a method of using a multi-card system according to an exemplary embodiment of the inventive concept.

FIG. 5 is a drawing conceptually and schematically illustrating a multi-card generation method, a multi-card use method, and a method of using a multi-card system according to an embodiment of the inventive concept.

Cards 10 issued by various card companies may be implanted in an IC card 100 via a terminal device 200 such as a smartphone. In other words, information necessary for payment of the cards 10 issued by the various card companies may be stored on an IC chip 110 of the IC card 100.

For this purpose, the terminal device 200 may include a near field communication (NFC) module. Information about the cards 10 issued by the various card companies may be stored in the IC chip 110 via the terminal device 200 in a state where the IC card 100 is tagged to the terminal device 200. In other words, card related data may be transmitted from systems which store card information to the terminal device 200. The terminal device 200 may store information associated with a plurality of cards 10 in the IC card 100 by transmitting the received card related data to the IC card 100 which is in the tagged state, using NFC A. Such a task may be performed through an application 210 running on the terminal device 200.

At least one of a plurality of cards stored in the one IC card 100 may be registered as a main card. The method for registering the main card may be performed in such a manner as to select one of the stored cards using the application 210 in a state where the IC card 100 is tagged to the terminal device 200. However, when the IC card 100 has a display unit and a button unit, a user may sequentially check a plurality of card information displayed on the display unit by pushing the button unit and may select a main card by selecting one of the plurality of displayed information.

Figure 1:
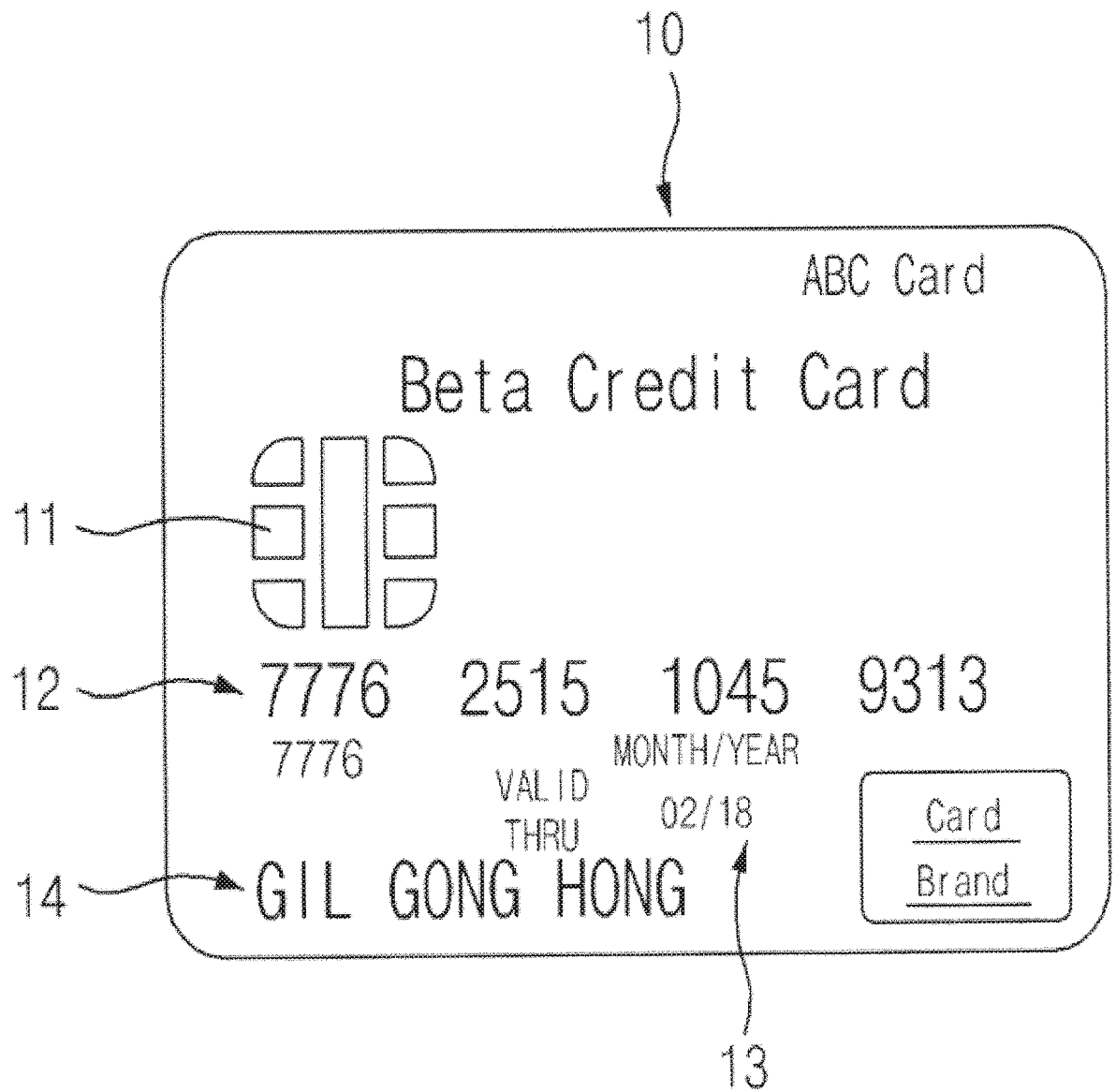
FIG. 1 is a drawing illustrating the appearance of a conventional card.
Figure 2:
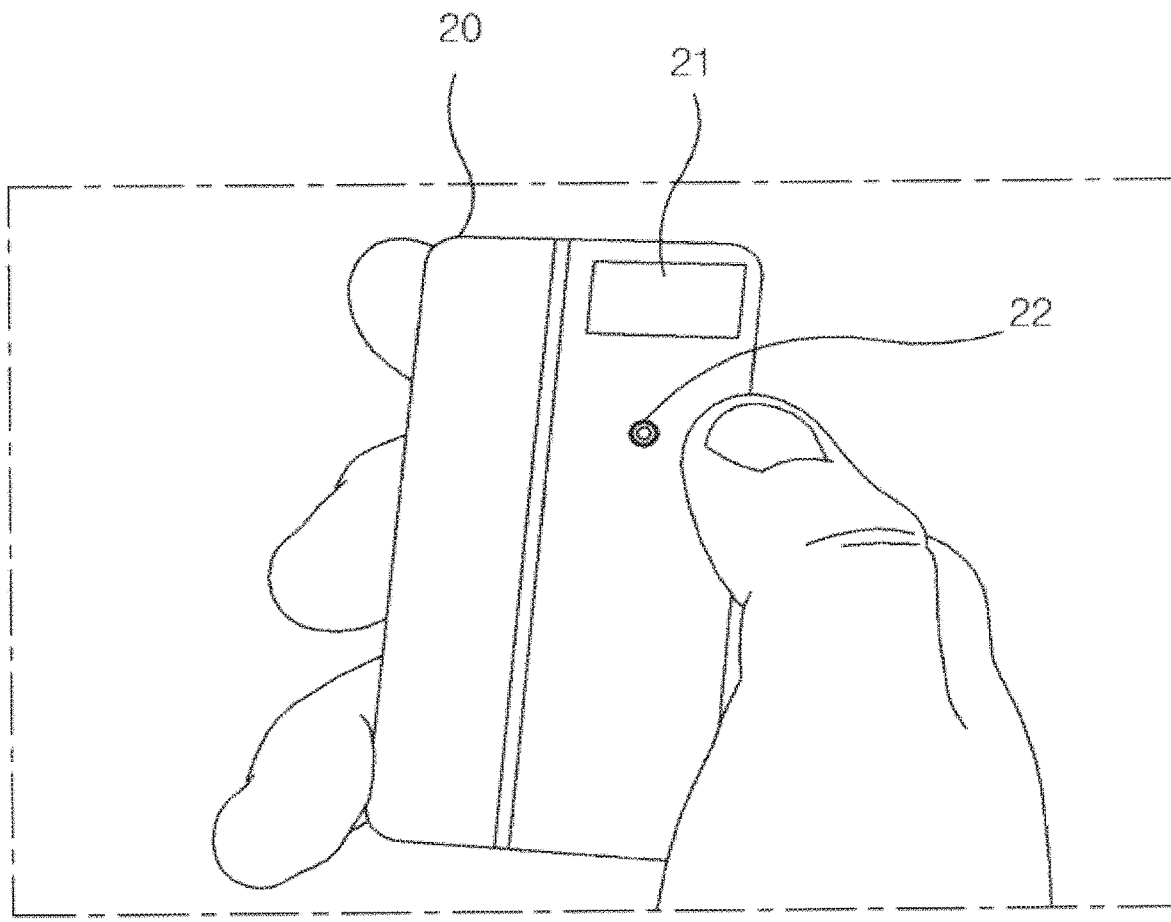
FIG. 2 is a drawing illustrating the appearance of a conventional multi-card developed to solve such a problem.
Figure 3:
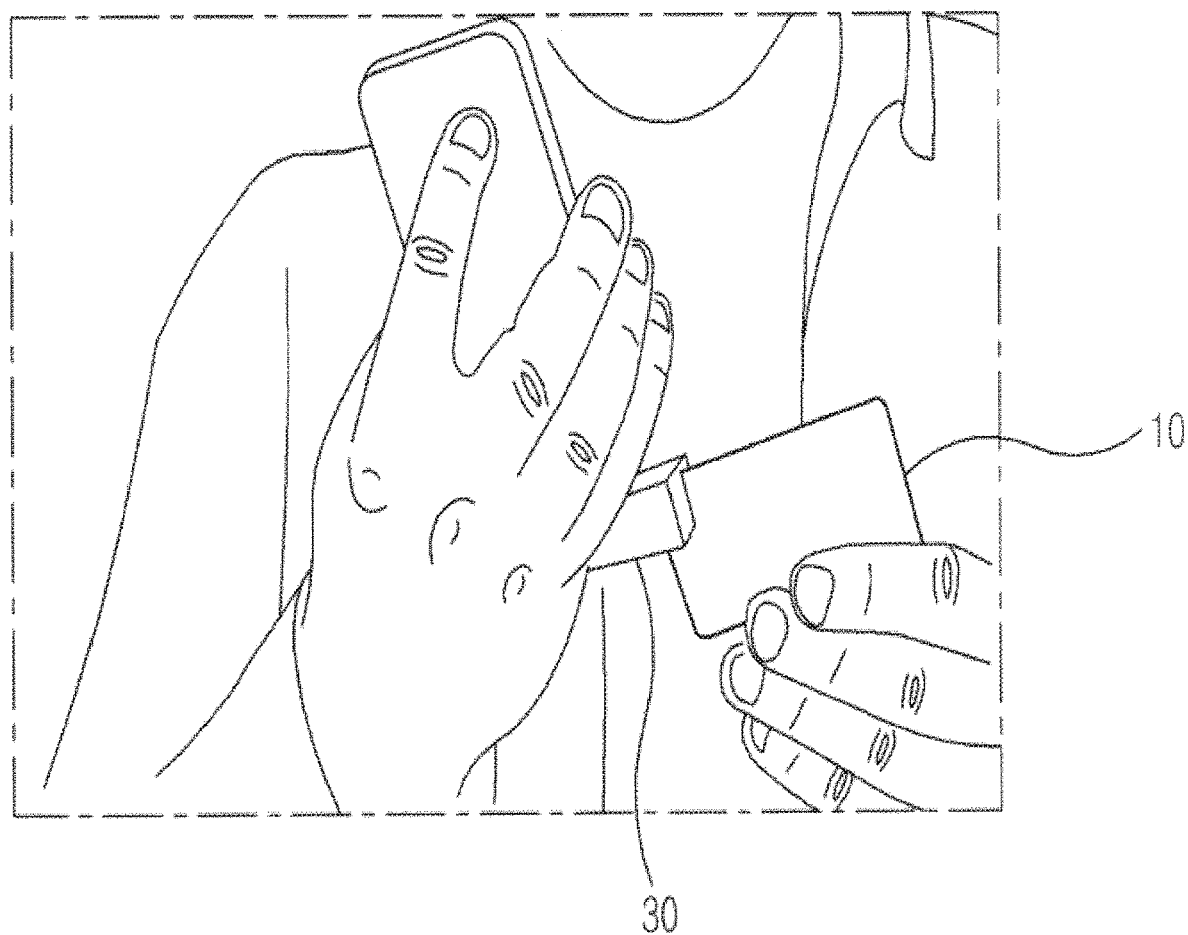
FIG. 3 is a drawing illustrating a method for storing card information in such a conventional multi-card.

As such, contrary to a conventional multi-card described with reference to FIGS. 2 and 3, the multi-card generation method and the multi-card use method according to an embodiment of the inventive concept may further improve security as compared with the conventional multi-card since an institution which has the right to issue a card directly issues the card in the IC card 100 via the terminal device 200.

Figure 6:
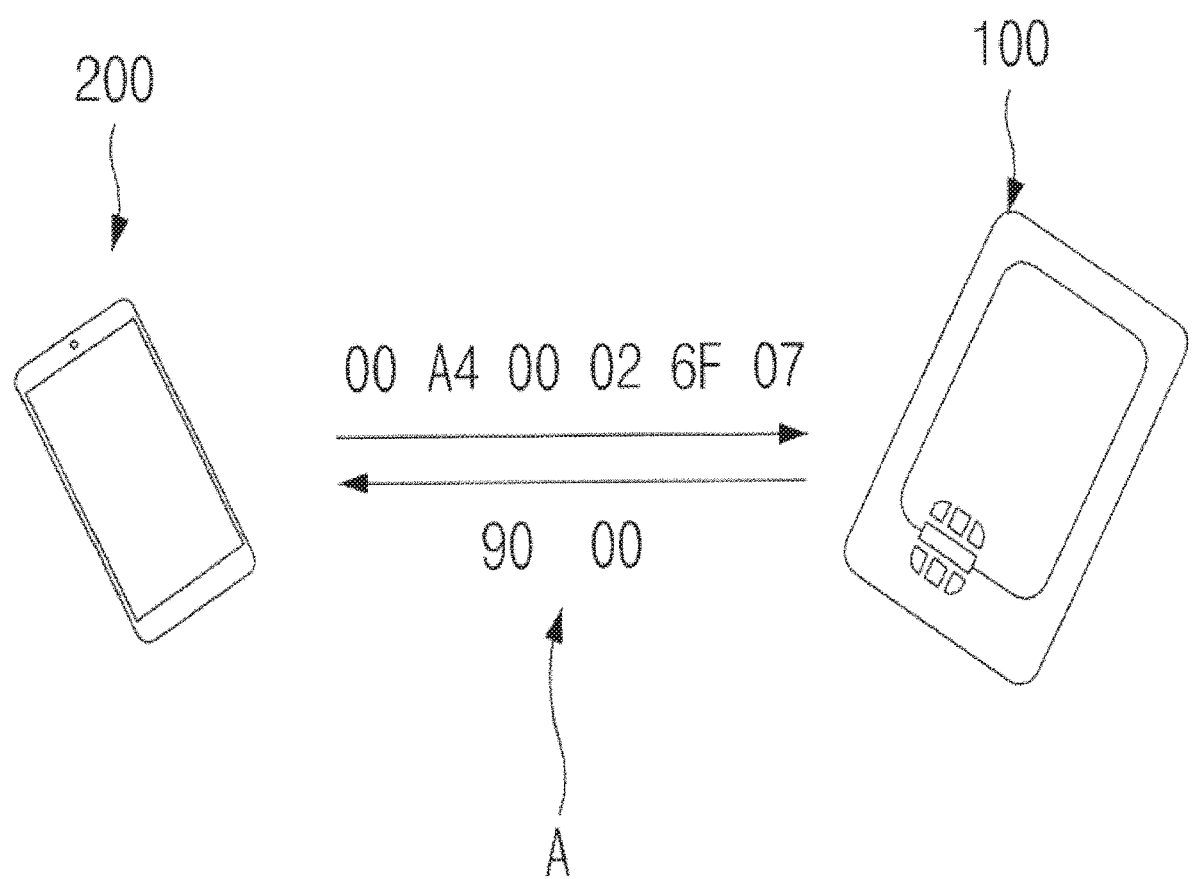
FIG. 6 is a schematic view illustrating a process of transmitting and receiving data between a terminal device and an IC card in a multi-card generation method, a multi-card use method, and a multi-card system according to an exemplary embodiment of the inventive concept.

FIG. 6 is a schematic view illustrating a process of transmitting and receiving data between a terminal device and an IC card in a multi-card generation method, a multi-card use method, and a multi-card system according to an embodiment of the inventive concept.

A terminal device 100 and an IC card 100 may communicates data via NFC A. In detail, the data communication between a terminal device 100 and an IC card 100 may be achieved using an application protocol data unit (APDU). The APDU corresponds a protocol for transmitting and receiving data between a card and a terminal device such as a smartphone. Simple programming may be implemented in the IC card 100 using the APDU.

Figure 7:
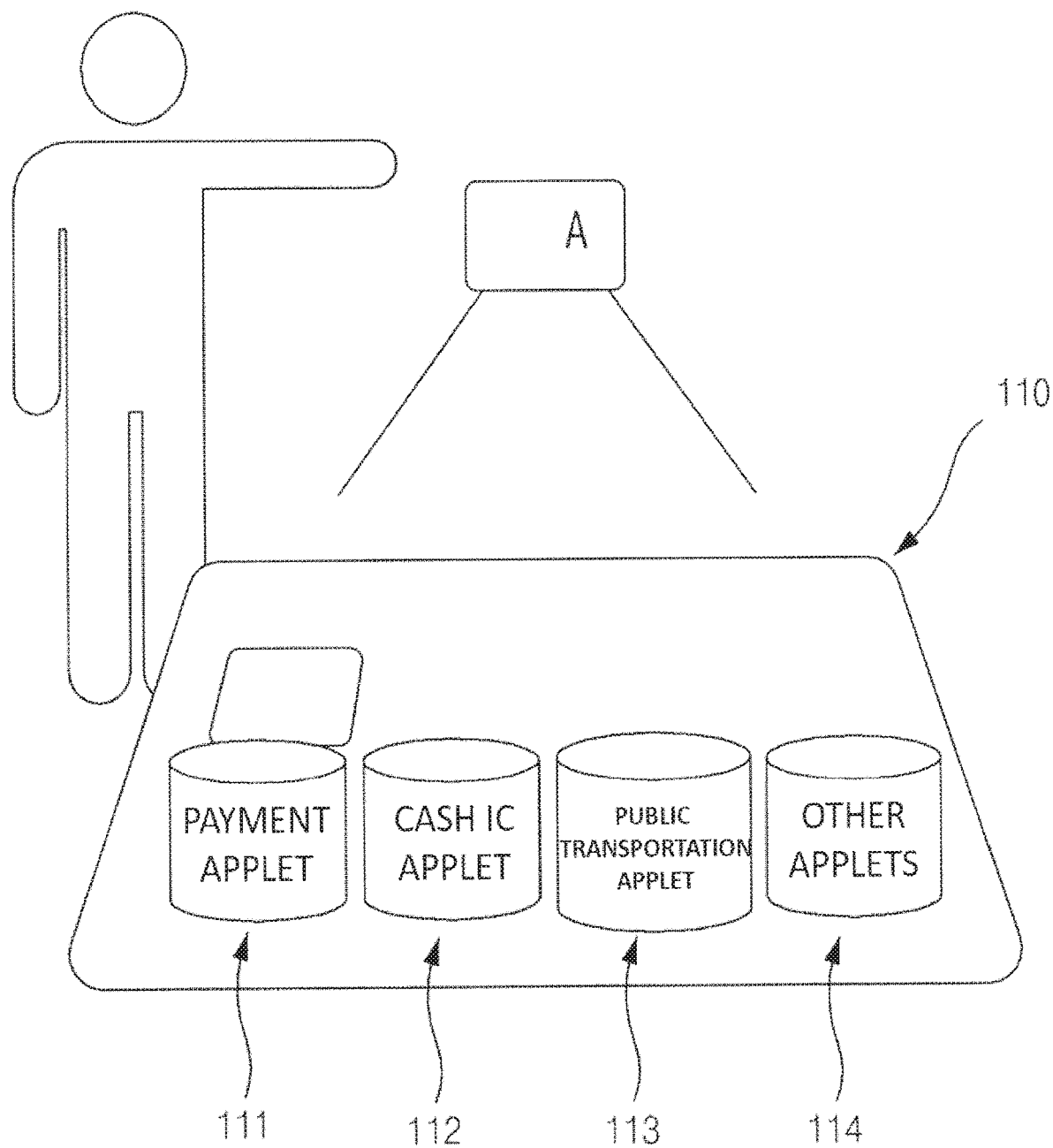
FIG. 7 is a drawing illustrating a variety of applets stored in an IC card in a multi-card generation method, a multi-card use method, and a multi-card system according to an exemplary embodiment of the inventive concept.

FIG. 7 is a drawing illustrating various applets stored in an IC card according to a multi-card generation method, a multi-card use method, and a multi-card system of an embodiment of the inventive concept.

Various types of products may be stored in an IC card 100 according to an embodiment of the inventive concept, and these products may be stored in an IC chip 110 in the form of an applet.

For example, the IC card 100 may include a payment applet 111, a cash IC applet 112, a public transportation applet 113, and the like. Applets which perform several functions may be stored as other applets 114 in the IC chip 110. In other words, if a user wants to be issued another card in the IC card 100 used in the multi-card generation method, the multi-card use method, and the multi-card system according to an embodiment of the inventive concept, he or she may be issued an applet of the card and may store such information on the IC chip 110.

A conventional multi-card described above may read information from a magnetic stripes of a conventional plastic card, copy the information, and store the information in a multi-card. However, the multi-card generation method, the multi-card use method, and the multi-card system according to an embodiment of the inventive concept may originally prevent illegal duplication from being performed in a card issuance process by directly receiving an applet from a card issuance institution to the terminal device 200 and storing the applet on the IC chip 110 of the card.

Figure 8:
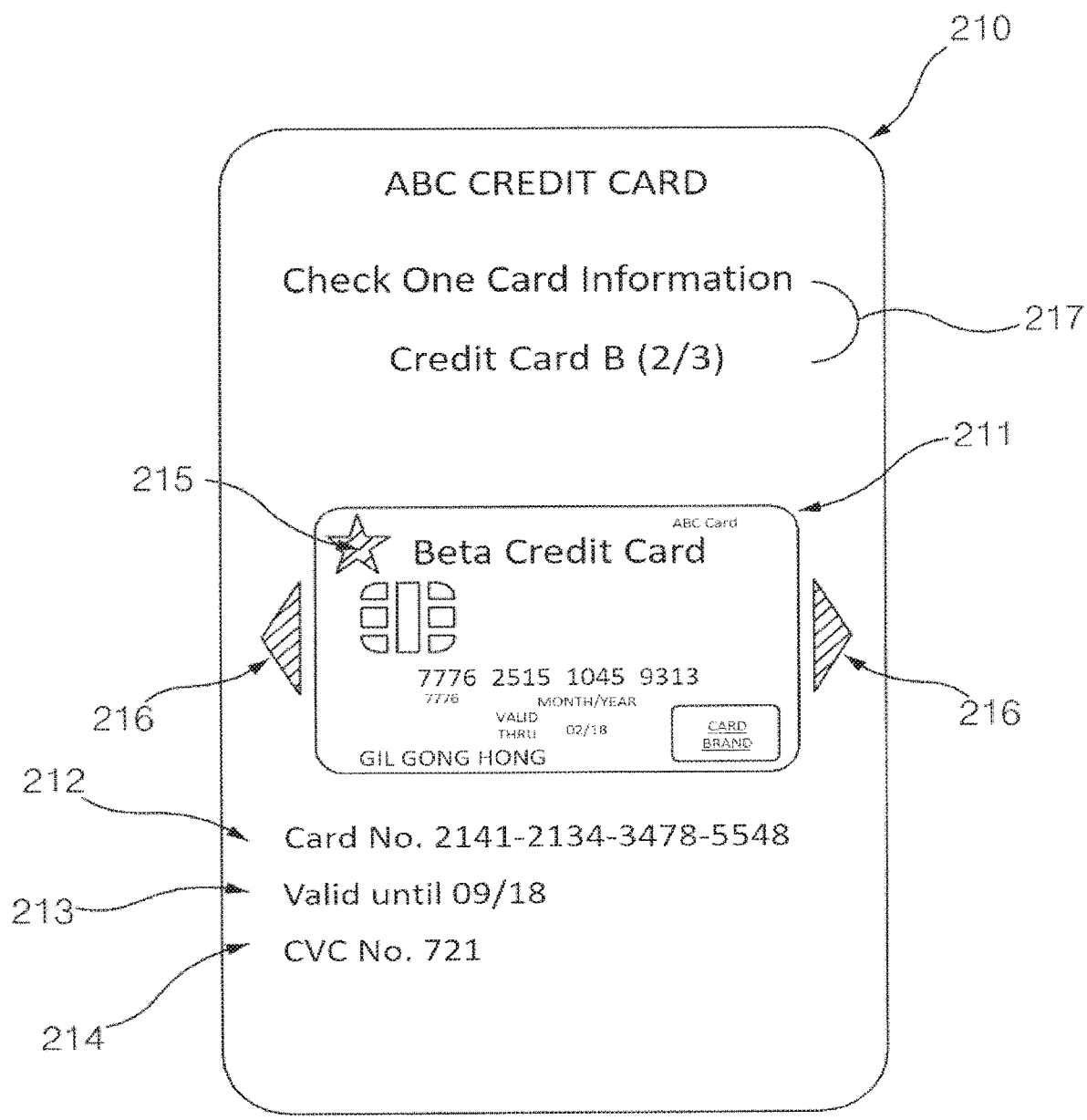
FIG. 8 is a drawing illustrating an application executed on a terminal device in a multi-card generation method, a multi-card use method, and a multi-card system according to an exemplary embodiment of the inventive concept.
Figure 9:
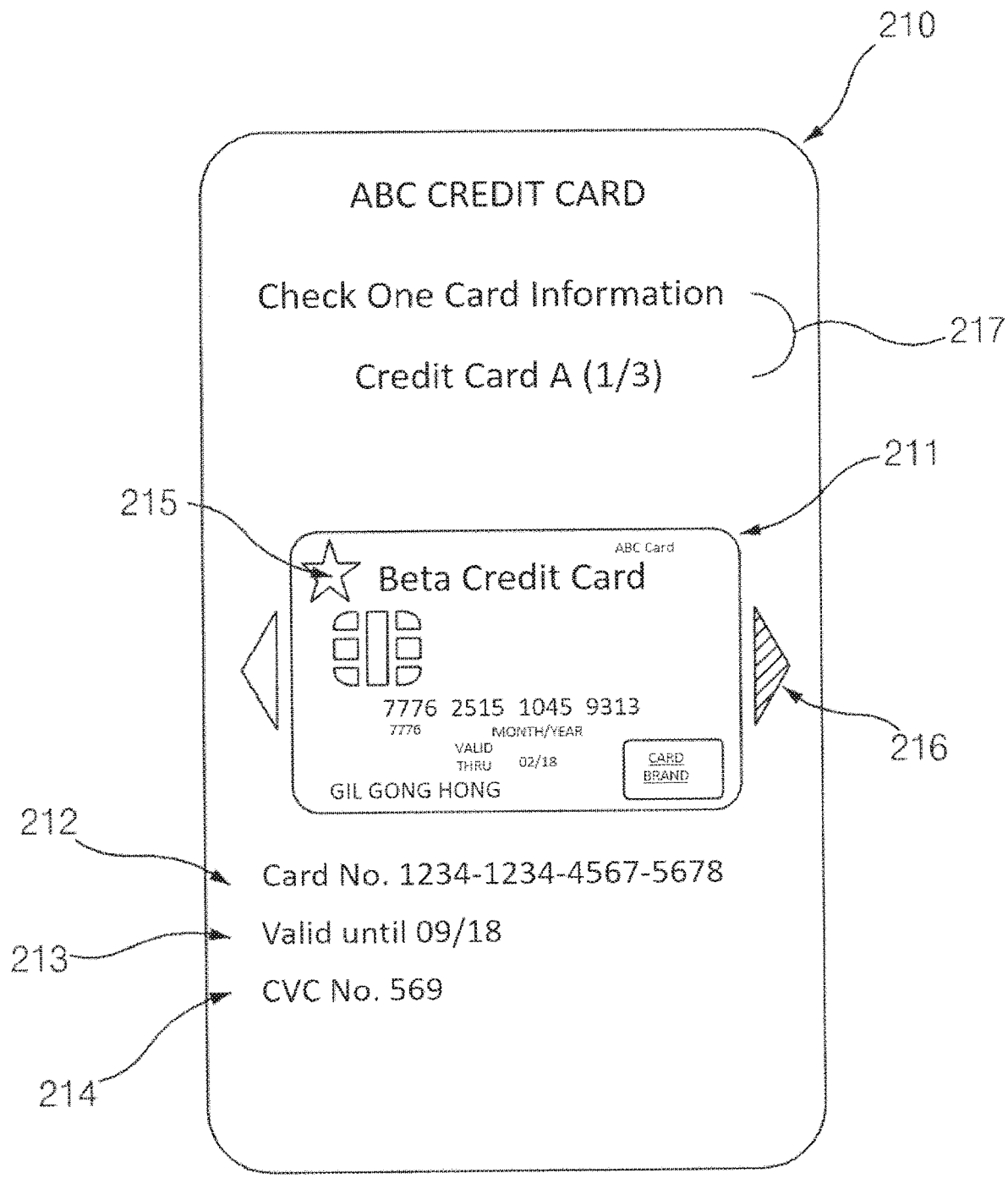
FIG. 9 is a drawing illustrating a process of verifying previous card information by clicking on a left arrow or swiping the left arrow from the left to the right in an application executed in a multi-card generation method, a multi-card use method, and a multi-card system according to an exemplary embodiment of the inventive concept.
Figure 10:
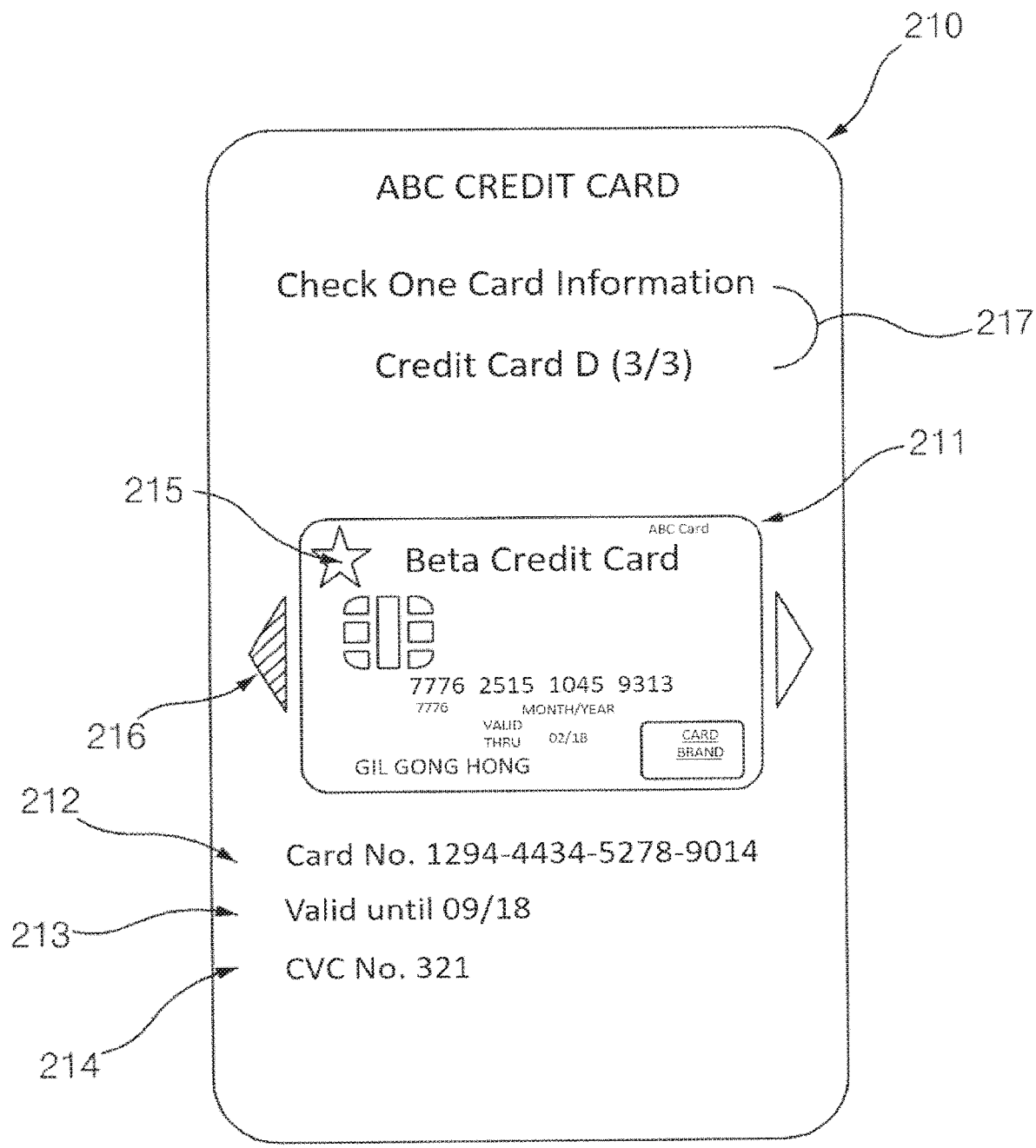
FIG. 10 is a drawing illustrating a process of verifying subsequent card information by clicking on a right arrow or swiping the right arrow from the right to the left in an application executed in a multi-card generation method, a multi-card use method, and a multi-card system according to an exemplary embodiment of the inventive concept.

FIGS. 8 to 10 are drawings illustrating an application running on a terminal device according to a multi-card generation method, a multi-card use method, and a multi-card system of an embodiment of the inventive concept.

In the multi-card generation method, the multi-card use method, and the multi-card system according to an embodiment of the inventive concept, when an application 210 of a terminal device 200 is executed and then an IC card 100 is tagged to the terminal device 100, information of cards stored in the IC card 100 may be shown to a user on the terminal device 200.

Information shown through the application 210 may include a card image 211, a card number 212, a card expiration date 213, a CVC number 214, other information 217 recorded in a card, and the like. In other words, as described above, information which may cause a security problem when a card number, an expiration date, a CVC number, and the like are not exposed on a surface of the IC card 100 used in an embodiment of the inventive concept. However, when the user needs this information, he or she may run the application 210 used in the multi-card generation method, the multi-card use method, and the multi-card system according to an embodiment of the inventive concept and verify this information by tagging the IC card 100 to the terminal device 200.

A main card display part 215 may be displayed on the card image 211 displayed on the application 210. When a corresponding card is selected as main card, the user may be notified that the card is displayed as the main card, through the main card display part 215. For example, as the main card display part 215 is displayed as a star shape on one side of the card image 211 and when the star shape is filled with yellow, the user may be notified that the card currently displayed on the application 210 is selected as the main card on the IC card 100. However, embodiments of the inventive concept are not limited to this example. For example, various modifications may be implemented according to embodiments.

Arrows 216 for performing a swipe operation may be provided at left and right sides of the card image 211 displayed on the application 210. Also, the user may directly touch these arrows 216 and may check previous or subsequent card information.

FIG. 9 is a drawing illustrating a process of displaying previously stored card information by swiping from the left to the right or clicking on a left arrow 216. FIG. 10 is a drawing illustrating a process of displaying subsequently stored card information by swiping from the right to the left or clicking on a right arrow 216.

A card image 211 of a card, a card number 212 of the card, a card expiration date 213 of the card, and a CVC number 214 of the card, other information 217 recorded in the card, and the like may be displayed on an application 210. In this case, a user may verify that the card is not selected as a main card, on a main card display part 215.

As such, since a multi-card generation method, a multi-card use method, and a multi-card system according to an embodiment of the inventive concept selects one of a plurality of cards stored in an IC card through the application 210 running on a terminal device 200 of FIG. 5, a passive IC card may not need to have a separate power supply therein.

Thus, only when the user wants to change a frequently used card, the user may tag an IC card 100 to the terminal device 200 and may select a card to be used without the necessity of periodically charging the IC card 100 like a conventional multi-card.

The multi-card generation method, the multi-card use method, and the multi-card system according to an embodiment of the inventive concept may select one of a plurality of cards stored in an IC card 100 as a main payment card and may select the other as a sub-payment card, using the application 210. This sub-payment card may be paid only when the main payment card is not approved to perform payment.

Thus, in using the IC card 100 according to an embodiment of the inventive concept, because the payment is performed by the sub-payment card when the main payment card is not paid due to an approval error, thus inconvenience in using the IC card 100 may be minimized. In other words, when a check card is set as the main payment card using the application 210, payment may be prevented from being declined due to an insufficient balance in an account linked to the check card.

Further, in the IC card 100 according to an embodiment of the inventive concept, one of a plurality of cards may be selected as a main payment card and the other cards may be selected as sub-payment cards having different priority orders, using the application 200. Thus, validity of payment may be ensured always except when all cards stored in the IC card 100 is not paid.

Figure 11:
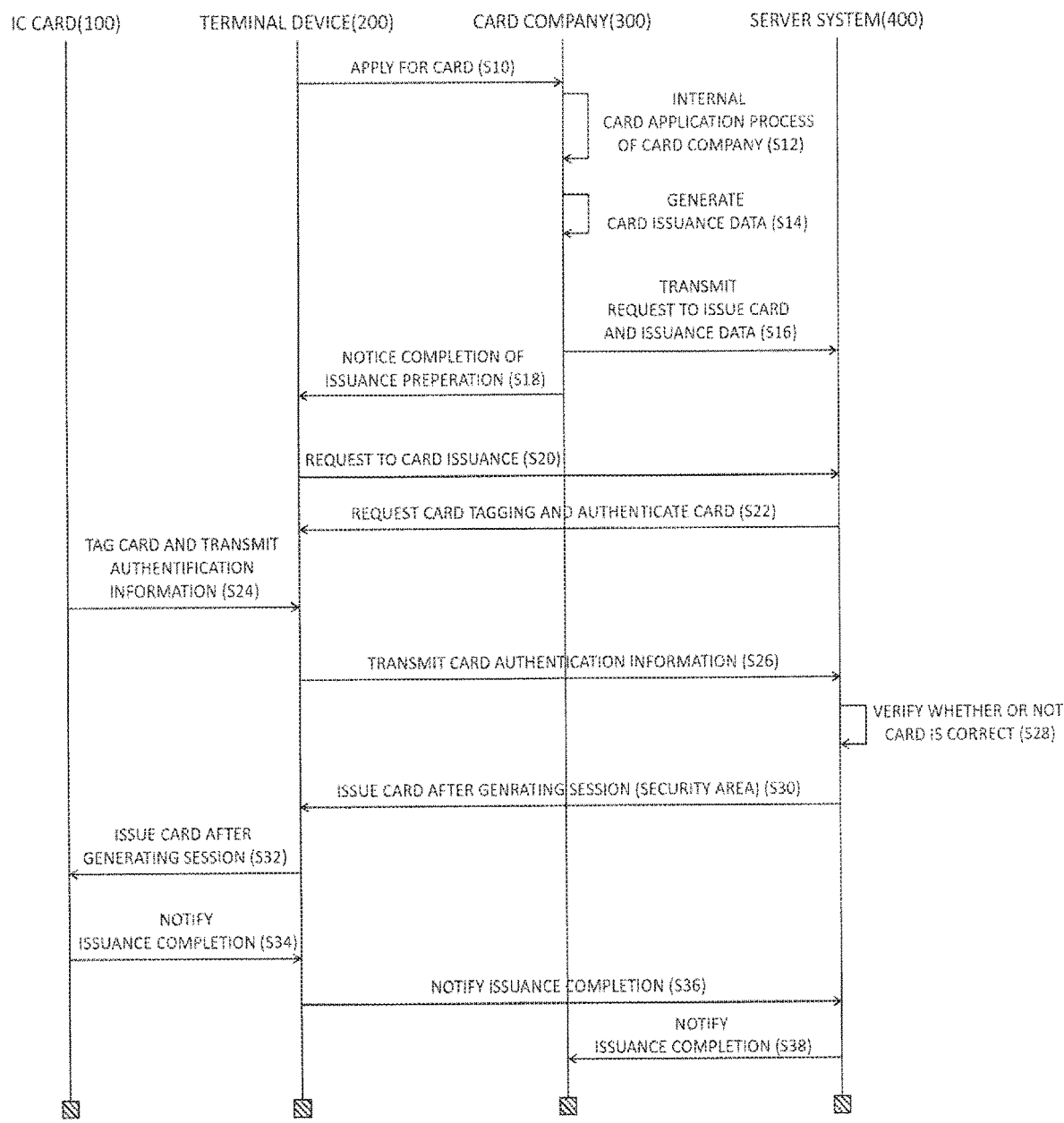
FIG. 11 is a signal sequence diagram illustrating a process of issuing a card in a multi-card generation method, a multi-card use method, and a multi-card system according to an exemplary embodiment of the inventive concept.

FIG. 11 is a sequence diagram illustrating a process of issuing a card in a multi-card generation method, a multi-card use method, and a multi-card system according to an embodiment of the inventive concept.

First of all, in operation S10, a card issuance is applied to a card company 300 by a terminal device 200. This step may be performed through an application after the application is executed on the terminal device 200, and may be performed under control of this application 210. The application for the card may be received by a server of the card company 300. In the description of the inventive concept, the card company 300 may be referred to as including a card company or a server of the card company.

Receiving the application for the card, in operation S12, the card company 300 may perform internal card application process. After the internal card application process in the card company 300 is completed, in operation S14, the card company 300 may generate a card issuance data.

In operation S16, the card company 300 may transmit the request to issue the card and the card issuance data to a server system when the card issuance data is generated, that is the requirements for the card issuance is satisfied. Herein, the server system 400 may correspond to a server which generates card information stored in an IC card 100. This server system 400 may be established with the server of the card company 300 or may be established to be independent server from the card company 300.

In operation S18, the card company 300 may notify the terminal device 200 that issuance preparation is completed.

Receiving the notification that the issuance preparation is completed, in operation S20, the terminal device 200 may request the server system 400 to issue the card.

In the description of the inventive concept, the card company 300 and the server system 400 may be independent of each other, but may be referred to as one component such as a card issuer server.

Receiving the request to issue the card from the terminal device 200, in operation S22, the server system 400 may request the terminal device 200 to be tagged to the IC card 100 and authenticate the card.

Receiving the request, the terminal device 200 may provide a request to tag the IC card 100 to a user on its display unit. Noticing this request, in operation S24, the user may tag the IC card 100 to the terminal device 200 to transmit authentication information to the terminal device 200.

Receiving this authentication information, in operation S26, the terminal device 200 may transmit card authentication information to the server system 400.

Receiving the card authentication information, in operation S28, the server system 400 may verify whether this card authentication information is correct information. When the card authentication information is the correct information as a result of the verification, in operation S30, the server system 400 may establish a session (security area) with the terminal device 200 and transmit information associated with issuing the card to the terminal device 200.

Receiving this information, in operation S32, the terminal device 200 may establish the session with the IC card 100 using NFC and may store this card information in the IC card 100.

Storing this card information, in operation S34, the IC card 100 may transmit a signal that issuance is completed to the terminal device 200. Receiving this signal, in operation S36, the terminal device 200 may transmit notification that the issuance is completed to the server system 400.

Receiving this notification that the issuance is completed, in operation S38, the server system 400 may terminate this card issuance process by transmitting the notification that the issuance is completed to the card company 300.

As such, in the multi-card generation method, the multi-card use method, and the multi-card system according to an embodiment of the inventive concept, the card company 300 may directly store a desired card in an IC chip of the IC card 100 via the terminal device 200 in the process of issuing the desired card to the IC card 100.

Thus, the terminal device 200 may be directly issued a card from the card company 300 without copying information of a magnetic card and storing the copied information in a conventional multi-card. The issued card may be stored in the IC card 100 via the terminal device 200. Thus, the terminal device 200 may be more securely issued the card.

Figure 12:
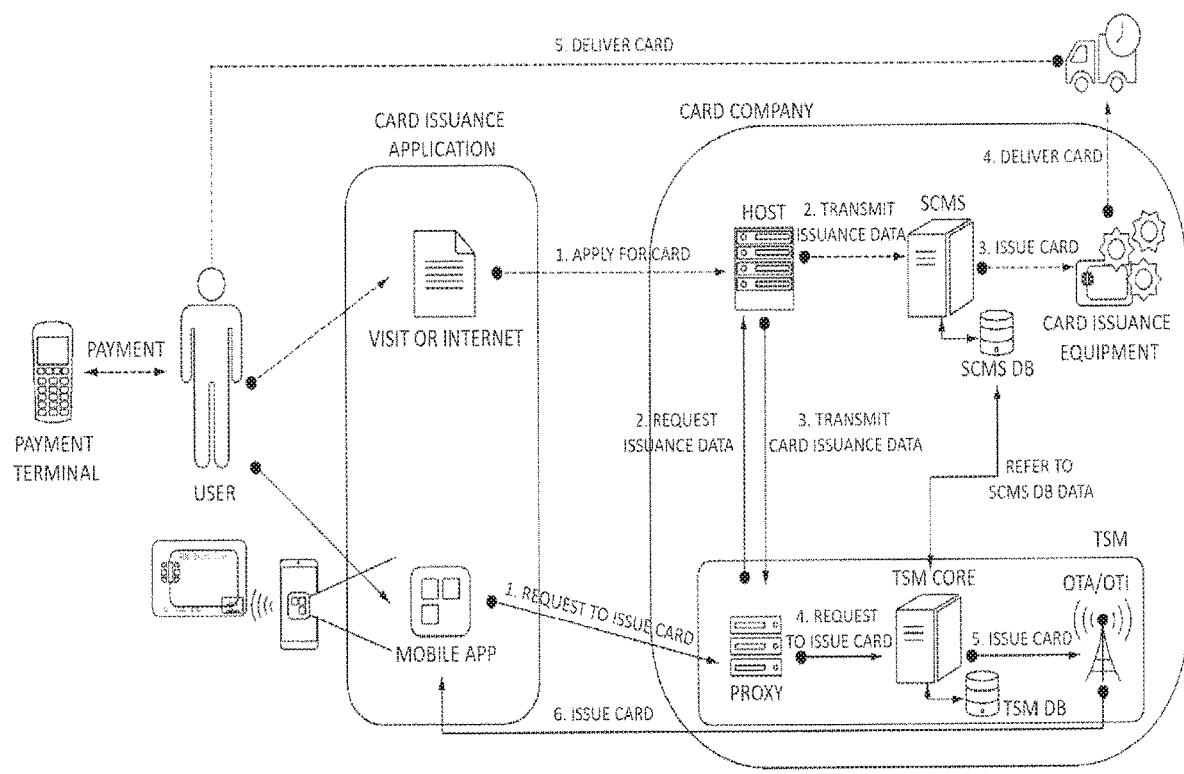
FIG. 12 is a schematic view illustrating a process of issuing a multi-card in a multi-card generation method, a multi-card use method, and a multi-card system according to an exemplary embodiment of the inventive concept.

FIG. 12 is a schematic view illustrating a process of issuing a multi-card in a multi-card generation method, a multi-card use method, and a multi-card system according to an embodiment of the inventive concept.

A dotted arrow in FIG. 12 may indicate an issuance process when an IC card 100 used in the multi-card generation method, the multi-card use method, and the multi-card system according to an embodiment of the inventive concept is initially issued. A solid arrow may indicate an issuance process when a card is additionally issued after a multi-card is initially issued.

A user may directly visit a card company or may perform a process of applying for the multi-card through the Internet, when the user want to initially issue a multi-card according to an embodiment of the inventive concept. However, application through a mobile application (app) is not limited.

When the user initially applies for a card, card application details may be transmitted to the card company (host). Issuance data may be transmitted to a smart card management system (SCMS).

The SCMS may store this information in an SCMS database (DB) and may approve to issue the card. The multi-card may be made and delivered to the user based on the approval of the SCMS. The IC card 100 used in the multi-card generation method, the multi-card use method, and the multi-card system according to an embodiment of the inventive concept may perform the delivery process only upon being initially issued.

In case of an additional card issuing, the user may execute an application 210 of a terminal device 200 and may tag the IC card 100 to the terminal device 200, thus requesting to issue the card.

After this request to issue the card is transmitted, a transaction state machine (TSM) may perform a process of requesting the card company (host) to issue the card via a proxy. When the card company (host) approves to issue the card, the proxy may perform a process of receiving card issuance data from the card company (host). Receiving the card issuance data, the proxy may request a TSM core of the TSM to issue the card. The TSM core may store related information in a TSM DB and may issue the card.

This card issuance information may be transmitted to the application 210 of the terminal device 200 through over the air (OTA) or over the internet (OTI). Receiving this information, the application 210 executed in the terminal device 200 may store information of the additionally issued card in an IC chip 110 of the IC card 100 via an NFC module of the terminal device 200.

Thus, after the IC card is initially issued, the card is immediately issued concurrently with applying for the card.

Lastly, the IC card 100 used in the multi-card generation method, the multi-card use method, and the multi-card system according to an embodiment of the inventive concept may be, but is not limited to, a combination (combi) IC card.

As described above, while the inventive concept has been described with reference to exemplary embodiments of the inventive concept, it may be understood to those skilled in the art that various modifications and changes may be made without departing from the spirit and scope of the inventive concept as set forth in the appended claims.

The invention claimed is:

1. A multi-card generation method executed by a terminal device having a memory and a processor, the method comprising: transmitting an issuance request to a card issuer server, wherein a new card which is issued in reply to the issuance request is stored in an integrated circuit (IC) chip included in a tangible card made of plastic materials;
   receiving a tagging request of the tangible card from the card issuer server and displaying the tagging request on a display unit;
   recognizing the tangible card by wirelessly connecting therewith through a near field communication as the tangible card is tagged to;
   receiving authentication information from the tagged tangible card through the near field communication;
   transmitting the authentication information received from the tangible card to the card issuer server;
   receiving card issuance information from the card issuer server, the card issuance information being transmitted from the card issuer server to the terminal device when the authentication information is verified;
   transmitting the card issuance information to the tangible card while the tangible card is tagged to the terminal device through the near field communication,
   directly issuing the new card onto the IC chip from the card issuer server via the terminal device by implanting the card issuance information in the IC chip while the tangible card is tagged to the terminal device through the near field communication, without copying magnetic information of the new card by a magnetic reader, wherein the tangible card stores a plurality of the card issuance information, and the plurality of the card issuance information are for different cards in reply to different card issuance requests, and wherein each of the plurality of the card issuance information is generated based on the authentication information from the tagged tangible card and each of the plurality of the card issuance information is stored in the IC chip in form of at least one applet;
   displaying card information of issued cards including a card image and a card number based on the plurality of the card issuance information stored in the IC chip, the issued cards being stored in form of at least one applet by receiving the card issuance information during the tangible card is tagged;
   generating information of a card selected as a payment card when one or more of the issued cards stored in the IC ship are selected;
   transmitting the information of the card selected as the payment card to the tangible card through the near field communication;
   after transmitting the card issuance information to the tangible card, receiving card issuance completion information from the tangible card while the tangible card is tagged to the terminal device through the near field communication; and
   transmitting the card issuance completion information to the card issuer server.

2. The method of claim 1, further comprising:
   after transmitting a card issuance application to the card issuer server, receiving card issuance preparation completion information from the card issuer server; and
   transmitting the issuance request to the card issuer server.

3. The method of claim 1, wherein the receiving the card issuance information from the card issuer server by the terminal device is performed by receiving the card issuance information from the card issuer server after a session is established.

4. The multi-card generation method of claim 1, wherein the new card is a credit card.

5. A multi-card system comprising:
   a tangible card made of plastic materials, the tangible card including an integrated circuit (IC) chip;
   a card issuer server; and
   a terminal device having a memory and a processor and configured to:
   transmit an issuance request to the card issuer server, wherein a new card which is issued in reply to the issuance request is stored in the integrated circuit (IC) chip included in the tangible card;
   receive a tagging request of the tangible card from the card issuer server and display the tagging request on a display unit;
   recognize the tangible card by wirelessly connecting therewith through a near field communication as the tangible card is tagged to;
   receive authentication information from the tagged tangible card through the near field communication;
   transmit the authentication information received from the tangible card to the card issuer server;
   receive card issuance information from the card issuer server, the card issuance information being transmitted from the card issuer server to the terminal device when the authentication information is verified;
   transmit the card issuance information to the tangible card while the tangible card is tagged to the terminal device through the near field communication,
   directly issue the new card onto the IC chip from the card issuer server via the terminal device by implanting the card issuance information in the IC chip while the tangible card is tagged to the terminal device through the near field communication, without copying magnetic information of the new card by a magnetic reader, wherein the tangible card stores a plurality of the card issuance information, and the plurality of the card issuance information are for different cards in reply to different card issuance requests, and wherein each of the plurality of the card issuance information is generated based on the authentication information from the tagged tangible card and each of the plurality of the card issuance information is stored in the IC chip in form of at least one applet;
   display card information of issued cards including a card image and a card number based on the plurality of the card issuance information stored in the IC chip, the issued cards being stored in form of at least one applet by receiving the card issuance information during the tangible card is tagged; generate information of a card selected as a payment card when one or more of the issued cards stored in the IC ship are selected;
   transmit the information of the card selected as the payment card to the tangible card through the near field communication;
   after transmitting the card issuance information to the tangible card, receive card issuance completion information from the tangible card while the tangible card is tagged to the terminal device through the near field communication; and
   transmit the card issuance completion information to the card issuer server.

6. The system of claim 5, wherein the terminal device generates and transmits selected card information to the tangible card by selecting one or more of the issued cards among the information of the issued cards received from the tangible card, and receives the card issuance information from the card issuer server and transmits the received card issuance information to the tangible card.

7. The system of claim 5, wherein the card issuer server receives the information of the issued cards from the tangible card through the terminal device, verifies whether the card information is correct, and issues the card issuance information to the tangible card through the terminal device when the card information is correct.

8. The system of claim 5, wherein the tangible card does not include a power supply.

* * * * *